June 30, 1925.  
C. H. JEFFERS  
LOCOMOTIVE STOKER  
Filed May 5, 1923
1,544,407
2 Sheets-Sheet 1
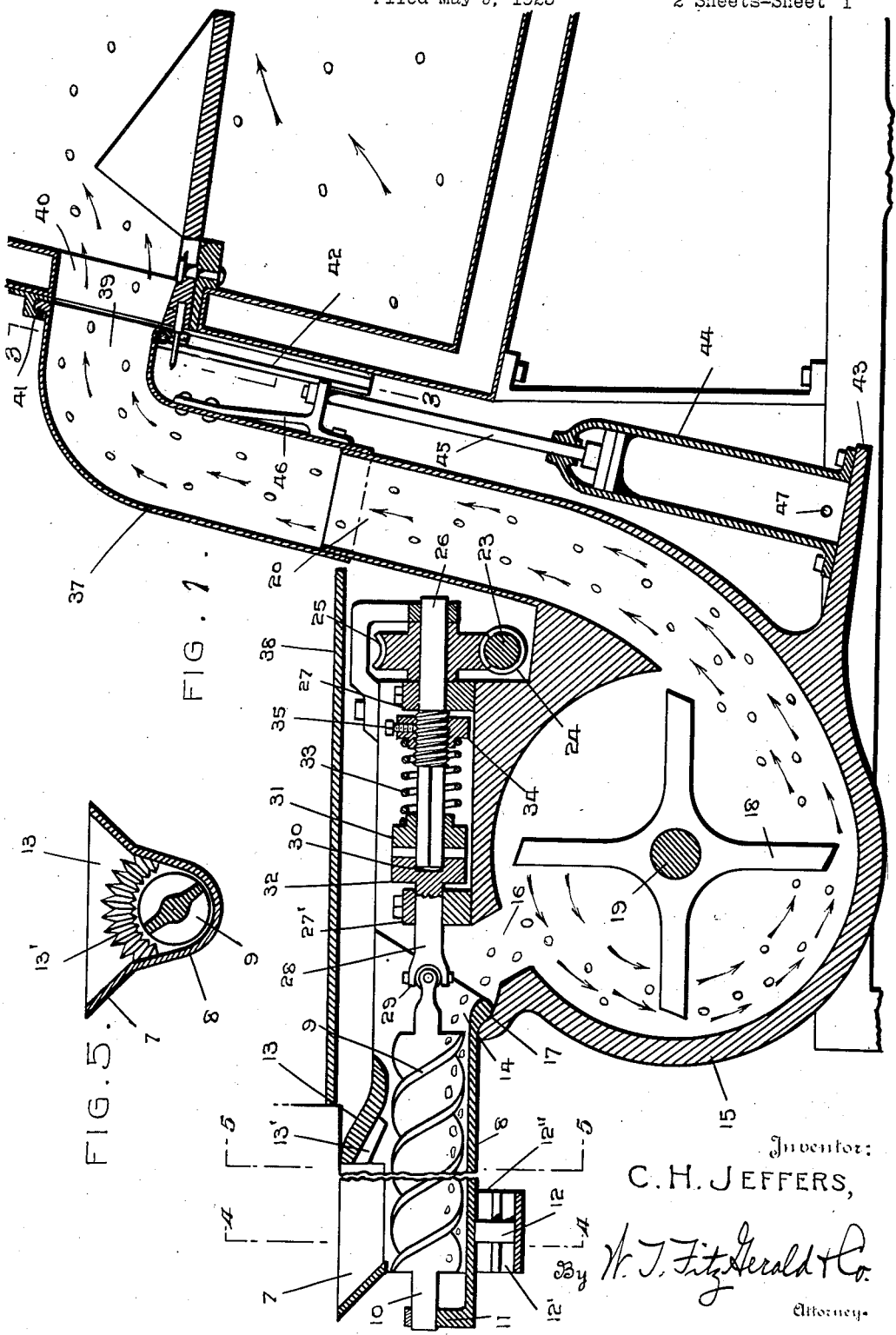
Inventor:  
C. H. JEFFERS,  
By W. T. Fitzgerald & Co.  
Attorney.

June 30, 1925.
C. H. JEFFERS
1,544,407
LOCOMOTIVE STOKER
Filed May 5, 1923
2 Sheets-Sheet 2
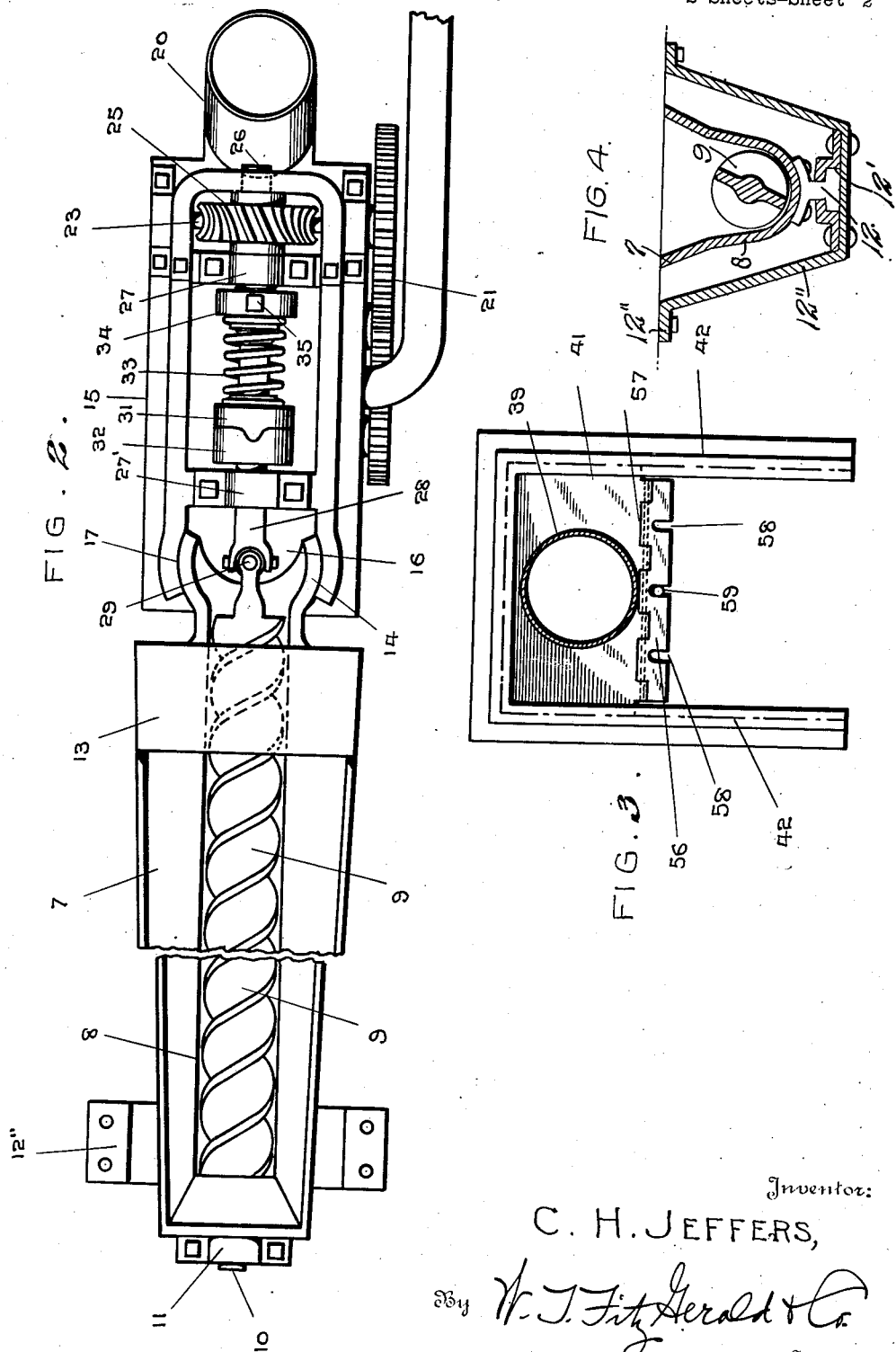
Inventor:
C. H. JEFFERS,
By W. J. FitzGerald & Co.
Attorney.

Patented June 30, 1925.

1,544,407

UNITED STATES PATENT OFFICE.

CARL H. JEFFERS, OF CANTON, OHIO.

LOCOMOTIVE STOKER.

Application filed May 5, 1923. Serial No. 636,792.

*To all whom it may concern:*

Be it known that I, CARL H. JEFFERS, a citizen of the United States, residing at Canton, in the county of Stark and State of Ohio, have invented certain new and useful Improvements in Locomotive Stokers; and I do hereby declare the following to be a full, clear, and exact description of the invention, such as will enable others skilled in the art to which it appertains to make and use the same.

The present invention relates to automatic locomotive stokers, and is particularly an improvement over the locomotive stoker disclosed in my Patent No. 1,423,221, granted July 18, 1922.

The invention also has for an object the improvement of the stoker generally in its construction and details, to enhance the utility and efficiency thereof.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Fig. 1 is a longitudinal vertical section of the stoker, portions being broken away and portions shown in elevation.

Fig. 2 is a plan view of the stoker, portions being broken away and portions removed.

Figs. 3, 4 and 5 are sectional details taken on the respective lines 3—3, 4—4, 5—5 of Fig. 2.

A conveyor trough 8 is provided to be disposed at the bottom of the tender and has a hopper 7 for receiving the coal from the tender, and an auger or screw conveyor 9 is rotatable in the trough for working the coal forwardly therein. The rear end of the trough 8 is open, and a rearwardly offset bearing 11 is supported from the rear end of the trough and has journaled therein the rearwardly extending stem or stub shaft 10 at the rear end of the conveyor 9.

The trough 8 is supported for longitudinal sliding movement or vibration due to the slackening and tensioning of the coupling between the locomotive and tender. Thus, the trough 8 is provided near its rear end with a rigid depending supporting lug 12 of inverted T-shape sliding in a rigid guide 12' provided in a U-shaped hanger 12" secured to the bottom of the tender, at opposite sides of the trough 8 and hopper 7, as seen in Fig. 4. The hanger 12" is thus rigidly secured to the tender and supports the trough 8 for longitudinal sliding movement therein with the headed lug 12 interengaged with the guide 12' to hold the trough on the support or hanger.

The trough 8 is provided near its forward end with an arched crusher 13 forming the forward end of the hopper 7, and the bottom of said crusher has the ribs or teeth 13' converging forwardly and extending close to the conveyor 9 at their forward ends. Thus, lumps of coal moved with the conveyor 9 under the crusher 13 will be ground into small pieces between the conveyor 9 and the ribs 13', thereby crushing the coal into small pieces before it is discharged from the trough.

Should a piece of slate, a rock or other hard object lodge in the crusher 13, so as to stop the rotation of the conveyor, such object can be ejected by reversing the rotation of the conveyor so as to work the object rearwardly and to discharge or eject it through the rear open end of the trough 8. This can be done even though the tender is full of coal, so that access to the crusher 13 cannot be had. The action of the conveyor at the sides and bottom of the trough will also assist in crushing the coal.

A centrifugal blower or fan is used for delivering the crushed coal into the firebox, and comprises the drum or casing 15 of cylindrical form with its axis disposed transversely of the locomotive, and said casing has an inlet 16 at the top with which the forward open end of the trough 8 communicates, for discharging the crushed coal from the trough through the inlet 16 into the casing 15. The forward end portion 14 of the trough is partly of spherical form and is fitted in a spherical recess 17 with which the inlet portion of the casing 15 is provided, thus providing a ball and socket connection or flexible joint between the blower casing and trough, permitting them to swing or vibrate relatively to one another due to the relative motion of the locomotive and tender. The rotor of the blower has the blades 18, and such rotor is secured on a transverse shaft 19 extending through the sides of the casing. Said shaft is rotated at a high speed, during the operation of the stoker, for delivering the crushed coal from the casing by centrifugal force up through a discharge pipe 20 extending upwardly from the front of the casing 15.

The conveyor 9 and blower shaft 19 are operatively connected, to be driven by the same power, for which a suitable motor or engine can be provided (not shown). The shaft 19 is geared, as at 21, to a transverse counter shaft 23 located between the pipe 20 and top of the blower casing, and a worm 24 on the shaft 23 meshes with a worm wheel 25 secured on a longitudinal shaft 26 journaled in a bearing 27 secured on the casing 15. A stub shaft 28 is journaled in a bearing 27' secured on the casing 15 immediately in front of the inlet 16, and has a universal or flexible joint 29 with the forward end of the conveyor 9, such joint being located at the center of the ball and socket joint between the trough 8 and casing 15, whereby the conveyor 9 and shaft 28 can flex relatively the same as the trough and the casing. A slip clutch is provided between the shafts 26 and 28, and includes a clutch member 31 slidable on the shaft 26 and a clutch member 32 integral with the forward end of the shaft 28 or secured to said shaft in any suitable manner, the confronting abutting faces of the clutch members having grooves and ribs to engage one another, as seen in Fig. 2, and to permit the clutch members to slip relatively to one another, so as to avoid breakage when the conveyor 9 is stopped by a lump of slate, rock or other obstruction in the crusher 13. The clutch member 32 has a recess 30 in which the rear end of the shaft 26 is journaled for rotation, and the clutch member 31 is held by spring pressure against the clutch member 32. Thus, a coiled spring 33 surrounds the shaft 26 and is confined between the clutch member 31 and a collar 34 mounted on the shaft 26. Said collar is adjustable to regulate the pressure of the spring, and, for this purpose, the collar is screw-threaded on the shaft, and is retained in its adjusted position by means of a set screw 35. The spring 33 normally holds the clutch member 31 in engagement with the clutch member 32 to drive the conveyor 9 when the blower shaft 19 is rotated, but the conveyor can stop without stopping the blower or breaking any part of the operative connection, inasmuch as the clutch member 31 is forced by cam action out of engagement from the clutch member 32, to permit the shaft 26 to continue its rotation. The gear ratio between the shaft 19 and shaft 26 is such that the blower is rotated at a high speed, while the conveyor 9 is rotated at a slow speed, thus conveying the coal slowly to the blower which delivers the coal at a high velocity through the pipe 20.

The forward end of the trough 8 and the blower are located below the deck 38 between the locomotive and tender, so as to be out of the way.

The crushed coal is delivered from the pipe 20 into the firebox by means of a delivery pipe or nozzle 37 which is slidable or telescoped on the pipe 20 so that it may be raised and lowered to and from delivery position. The upper end 39 of the nozzle 37 is curved or directed forwardly to register with the fuel door opening 40 of the firebox when the nozzle is raised, thereby directing the coal rearwardly through the opening 40 into the firebox when it is forced up through the pipe 20 by the blower.

The nozzle 37 has a plate 41 surrounding the end 39 and slidable in a guide 42, to guide the nozzle 37 to and from delivery position, and said plate also closes the opening 40 around the end 39 of the nozzle when said nozzle is raised.

The nozzle is raised by pressure fluid, such as steam or compressed air, for which purpose a cylinder 44 is secured on a supporting bracket 43 projecting forwardly from the blower casing 15, and the piston rod 45 extends upwardly and is connected to a bracket 46 secured to the front wall of the nozzle 37, whereby the nozzle is raised and lowered with the piston. The cylinder 44 has a pressure fluid inlet 47 near its lower end for admitting the fluid, to raise the piston and nozzle, as seen in Fig. 1, and when the fluid is permitted to discharge, the nozzle and piston will gravitate, thereby removing the nozzle from the fuel door opening 40 down out of the way.

Having thus described the invention, what is claimed as new is:—

1. A stoker comprising a fuel delivery blower including a casing having an inlet portion, a fuel trough, the delivery end of the trough and said inlet portion of the casing being formed with spherical surfaces fitted one within the other to provide a ball and socket connection between the casing and trough through which the fuel flows from the trough into the casing, a screw conveyor within the trough, and actuating means for the conveyor assembled with said casing, said actuating means and conveyor having a flexible connection centrally of said ball and socket joint.

2. A stoker comprising a fuel delivery blower including a casing, a fuel trough having a flexible connection with the casing, a conveyor working in said trough for feeding fuel into the blower casing, a support for said trough located under the trough, and a sliding connection between said support and trough including portions rigidly united with said trough and support, one portion constituting a longitudinal guide, and the other portion working in said guide, said portions being interengaged to hold the trough on the support.

In testimony whereof I have signed my name to this specification in the presence of two subscribing witnesses.

CARL H. JEFFERS.

Witnesses:
JAMES L. SHARICK,
ALBERT J. NUSLY, JR.